(12) United States Patent
Moniot

(10) Patent No.: US 6,876,662 B1
(45) Date of Patent: Apr. 5, 2005

(54) SYSTEM FOR CONTROLLING THE RATES OF CONCURRENT TRANSMISSIONS ON A COMMUNICATION CHANNEL

(75) Inventor: Pascal Moniot, Bernin (FR)

(73) Assignee: STMicroelectronics S.A., Montrouge (FR)

( * ) Notice: Subject to any disclaimer, the term of this patent is extended or adjusted under 35 U.S.C. 154(b) by 0 days.

(21) Appl. No.: 09/491,789

(22) Filed: Jan. 26, 2000

(30) Foreign Application Priority Data

Jan. 29, 1999 (FR) .............................................. 99 01191

(51) Int. Cl.[7] .............................. H04L 12/26; H04J 3/14; G06F 11/00; G08C 15/00; G01R 31/08
(52) U.S. Cl. ........................ 370/412; 370/230; 370/389; 370/395; 370/468
(58) Field of Search ................................ 370/230–235, 370/389–395, 352, 355, 412–418, 423–429, 462–468, 229

(56) References Cited

U.S. PATENT DOCUMENTS

| | | | | |
|---|---|---|---|---|
| 5,535,201 A | * | 7/1996 | Zheng ........................ 370/230 |
| 5,579,312 A | * | 11/1996 | Regache .................... 370/397 |
| 5,619,502 A | | 4/1997 | Kahn et al. ................. 370/397 |
| 5,629,937 A | * | 5/1997 | Hayter et al. .............. 370/233 |
| 5,719,865 A | * | 2/1998 | Sato ........................... 370/395 |
| 5,946,297 A | * | 8/1999 | Calvignac et al. ......... 370/230 |
| 5,982,771 A | * | 11/1999 | Caldara et al. ............ 370/389 |
| 6,002,666 A | * | 12/1999 | Fukano ...................... 370/230.1 |
| 6,005,868 A | * | 12/1999 | Ito ............................. 370/413 |
| 6,021,115 A | * | 2/2000 | Simpson et al. ............ 370/235 |
| 6,044,060 A | * | 3/2000 | Jones ......................... 370/230.1 |
| 6,072,772 A | * | 6/2000 | Charny et al. .............. 370/229 |
| 6,101,187 A | * | 8/2000 | Cukier et al. ............... 370/396 |
| 6,198,724 B1 | * | 3/2001 | Lam et al. .................. 370/233 |
| 6,445,680 B1 | * | 9/2002 | Moyal ........................ 370/236 |
| 6,483,839 B1 | * | 11/2002 | Gemar et al. ............... 370/395 |
| 6,621,824 B1 | * | 9/2003 | Lauffenburger et al. .... 370/412 |
| 6,661,774 B1 | * | 12/2003 | Lauffenburger et al. . 370/230.1 |

FOREIGN PATENT DOCUMENTS

EP   A-0 810 809    12/1997 ........... H04Q/11/04

* cited by examiner

Primary Examiner—Man U. Phan
(74) Attorney, Agent, or Firm—Lisa K. Jorgenson; William R. McClellan; Wolf, Greenfield & Sacks, P.C.

(57) ABSTRACT

A method is provided for controlling the rates of concurrent digital transmissions using at least a first queue having a plurality of locations. For each transmission, an index corresponding to a data cell of the transmission is written at one of the locations in the first queue, and the locations of the first queue are successively surveyed at a rate corresponding to a cell transmission rate. If the surveyed location in the first queue contains an index, the corresponding data cell is transmitted, the location is freed, and the index is rewritten at the location in the first queue that is distant from the surveyed location by a value determined by the rate of the corresponding transmission. In one preferred method, indexes corresponding to high priority transmissions are written into the first queue and indexes corresponding to lower priority transmissions are written into a second queue. Also provided is a method for controlling the rates of concurrent digital transmissions using at least first and second queues.

20 Claims, 2 Drawing Sheets

Fig 1

PRIOR ART

SYSTEM FOR CONTROLLING THE RATES OF CONCURRENT TRANSMISSIONS ON A COMMUNICATION CHANNEL

CROSS-REFERENCE TO RELATED APPLICATIONS

This application is based upon and claims priority from prior French Patent Application No. 99-01191, filed Jan. 29, 1999, the entire disclosure of which is herein incorporated by reference.

BACKGROUND OF THE INVENTION

1. Field of the Invention

The present invention relates to electronic systems, and more specifically to a system for controlling the rates of multiple transmissions having different rate constraints on the same communication channel.

2. Description of Related Art

Figure 1:
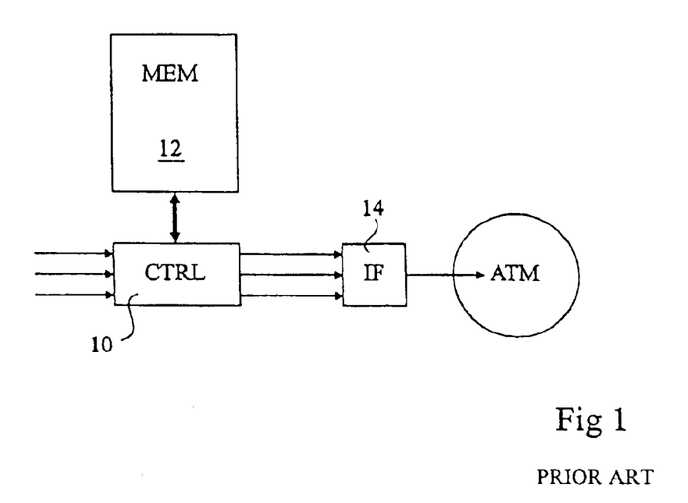
FIG. 1 shows a block diagram of a circuit for transmission over an ATM network.

"Traffic shaping", or controlling the rates of multiple transmissions having different rate constraints on the same communication channel is used in devices such as a multi-protocol switch that acts as an interface between an ATM network and Ethernet networks. FIG. 1 shows a switch transmitting over an ATM network. The data of several concurrent transmissions, or open connections, reach a control circuit 10 that stores the data in a memory 12 before sending it in a controlled way over the ATM network via an adequate interface 14.

When a connection is created on an ATM network, there is an initial handshake between the transmitter and the network to determine, among other things, the transmission flow rate that will be used for the transmission. Indeed, the available transmission rate over an ATM network (for example, 155 Mbits/s) must be shareable in real time between all the possible connections. Thus, at the end of the handshake, a rate is assigned to the new connection, which rate must be respected or the network will loose its data.

Further, the handshake also concerns a type of connection which determines a "profile" or rate. The typical connection types are CBR ("constant bit rate"), VBR ("variable bit rate") in real time or not, ABR ("available bit rate"), and UBR ("unspecified bit rate"). For CBR type connections, the network guarantees a fixed rate, which must not be exceeded. For real time VBR connections, the network determines a peak cell rate (PCR) and guarantees a sustainable cell rate (SCR) and a maximum burst size (MBS). The source can transmit at the peak cell rate PCR during a burst of the MBS at negotiated times and transmit at the SCR otherwise.

Further, for real time VBR connections, the network guarantees a cell delay variation objective (CDV). Connections of VBR type that are not in real time have the same features as real time VBR connections, but guarantee no cell delay variation objective CDV. For connections of the ABR type, the network determines the peak cell rate (PCR) and guarantees a minimal cell rate (MCR), with the transmission rate being likely to vary between the two limits. Finally, for UBR type connections, the network guarantees no rate. The network uses the "as good as possible" method.

A circuit controlling transmission over an ATM network must thus control the rates of the data transmitted over the ATM network to respect the negotiated bit rate profiles. For this purpose, conventional traffic shaping circuits associate, with the connections open in transmission, counters that count the number of data transmitted in order to deduce therefrom the bit rate and adjust the data transmission so that the connection is conformable to the negotiated parameters. The managing of these counters and the corresponding control result in complex control circuits. An example of such a control circuit is described in U.S. Pat. No. 5,724,513.

SUMMARY OF THE INVENTION

It is an object of the present invention to provide a traffic shaping method that is simple to practically implement in a circuit.

One embodiment of the present invention provides a method for controlling the rates of concurrent digital transmissions using at least a first queue having a plurality of locations. According to the method, for each transmission, an index corresponding to a data cell of the transmission is written at one of the locations in the first queue, and the locations of the first queue are successively surveyed at a rate corresponding to a cell transmission rate. If the surveyed location in the first queue contains an index, the corresponding data cell is transmitted, the location is freed, and the index is rewritten at the location in the first queue that is distant from the surveyed location by a value determined by the rate of the corresponding transmission. In a preferred embodiment, indexes corresponding to high priority transmissions are written into the first queue and indexes corresponding to lower priority transmissions are written into a second queue.

Another embodiment of the present invention provides a method for controlling the rates of concurrent digital transmissions using at least first and second queues having a plurality of locations. According to the method, for each transmission, an index corresponding to a data cell of the transmission is written at one of the locations in the first queue and/or the second queue. The locations of the first queue are successively surveyed at a higher rate than a cell transmission rate, and the locations of the second queue are successively surveyed. If the surveyed location in the first queue contains an index, the corresponding data cell is transmitted, the location is freed, and the index is rewritten at the location in the first queue that is distant from the surveyed location by a predetermined value. Further, the surveying of the first queue is interrupted when the location indicated by a rate pointer is reached, and the rate pointer is incremented by N locations at the transmission rate of N cells. In one preferred method, if the surveyed location in the second queue contains an index, the corresponding data cell is transmitted when the surveyed location in the first queue does not contain an index or when the surveying of the first queue is interrupted.

Other objects, features, and advantages of the present invention will become apparent from the following detailed description. It should be understood, however, that the detailed description and specific examples, while indicating preferred embodiments of the present invention, are given by way of illustration only and various modifications may naturally be performed without deviating from the present invention.

DETAILED DESCRIPTION

Preferred embodiments of the present invention will be described in detail hereinbelow with reference to the attached drawings.

Figure 2:
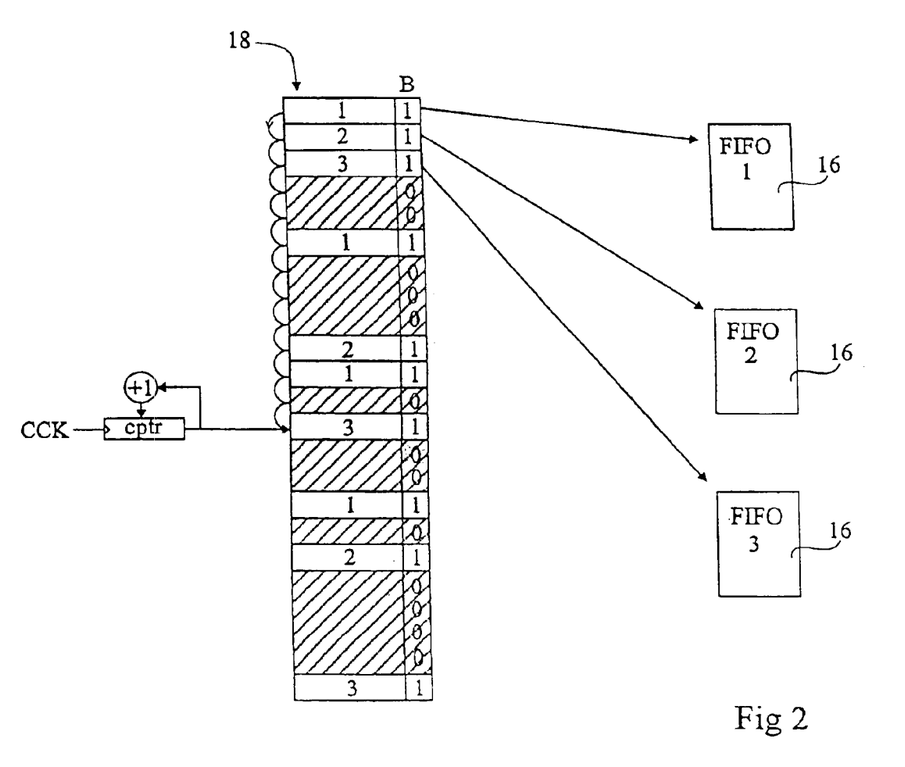
FIG. 2 illustrates a first memory organization that is used by a transmission rate control method according to one embodiment of the present invention.

FIG. 2 illustrates a first traffic shaping mode according to one embodiment of the present invention. The data to be transmitted over an ATM network is conventionally transmitted by "cells", each cell including 53 bytes. The number of concurrent transmissions is variable and each of them is assigned to an "open connection". To each open connection is assigned, in memory 12 of FIG. 1, a FIFO buffer 16 in which are stored the cells for the connection that are to be transmitted over the ATM network. In a queue 18, indexes are written, with each index corresponding to an open connection and pointing towards the associated buffer 16. A cell pointer cptr points to the location of queue 18 being processed.

The cell pointer is incremented by units at the rate of a cell clock CCK and accordingly defines the cell transmission order. The period of clock CCK is equal to one cell time, a cell time being the time used to transmit a cell and being determined by the maximum dedicated pass-band on the physical transmission link. Each index contains, in addition to a pointer towards a cell to be transmitted, information about the connection such as the type (CBR, VBR, or ABR) and the rate profile (mean cell rate and/or peak cell rate). The procedure of index inscription into the queue 18 in accordance with the present invention will now be described.

Upon the opening of a new connection, the corresponding index is written into the first free location found by cell pointer cptr. A bit B indicates whether each location is occupied or not. In the example of FIG. 2, indexes 1, 2, and 3 have been consecutively written at the first three locations of queue 18, and these indexes point to corresponding buffers (16) 1, 2, and 3. If cell pointer cptr comes across a free location, no action is taken during the corresponding cell time, except that pointer cptr is incremented.

If cell pointer cptr comes across a location containing an index, the cell provided by the corresponding buffer 16 is immediately transmitted. Additionally, the location is freed and the index is written again in queue 18 at a distance inversely proportional to the rate of the associated transmission. In the example of FIG. 2, index 1 is rewritten five locations away (from its former location), index 2 is rewritten 8 locations away, and index 3 is rewritten 10 locations away. This means that the transmission associated with index 1 is twice as fast as the transmission associated with index 3 and 8/5 times as fast as the transmission associated with index 2. Queue 18 is used circularly (that is, an index near the end of the queue is rewritten, if necessary, at the beginning of the queue). If the target location where an index should be rewritten is occupied, the index is rewritten at the closest neighboring free location, before or after the target location.

The size of queue 18 as well as the frequency of clock CCK determine the minimal rate of a connection. More specifically, to come across an index as late as possible in the queue, the index must be rewritten at the same location where it used to be (that is, at a distance equal to the queue size). The queue size is thus chosen according to the minimal rate that it is desired to ensure. With this configuration, if the number of connections remains relatively small, a given index will be periodically found by cell pointer cptr, with the period being inversely proportional to the rate associated with the index. In other words, a constant rate is ensured for the connection.

If the number of connections increases, the probability for an index to be exactly rewritten at the desired distance decreases. More specifically, the index is written sometimes slightly before the target location and sometimes slightly after, so that a rate slightly fluctuating around a constant mean value is obtained. This phenomenon is called the cell time jitter. In fact, the queue locations are occupied according to a pseudo-random law so that it is probable to periodically find a concentration of consecutive occupied locations. The size of the concentration increases with the number of connections. When the number of connections is high, it is probable for indexes to be rewritten far away from the target locations, which results in a significant fluctuation of the instantaneous rate, which could be incompatible with CBR type connections (that is, constant bit rate).

A first solution according to the present invention for overcoming such a problem consists of writing into queue 18 a ghost index, which corresponds to no real connection but to a ghost connection of a random rate. More specifically, when cell pointer cptr comes across a location containing a ghost index, no cell is transmitted, the location is freed, and the ghost index is rewritten at a random distance. A location occupied by a ghost index, like a location occupied by a normal index, cannot be used to write another index, whether this index be that of a new connection or an index to be rewritten.

A priori, this solution adds to the queue congestion and reduces the number of locations available to write indexes. However, since a ghost index randomly occupies possible target locations for normal indexes, the normal indexes are rewritten with a random shifting with respect to their target locations and, as a result, the indexes are no longer periodically distributed with a concentration probability. In other words, holes that ease the search for a free location in the vicinity of an occupied target location are randomly created. However, this solution is insufficient if the connections become too numerous, since the different types of connections are processed in the same way. More specifically, all the connections become connections of constant mean rate but of variable instantaneous rate, the variation of the instantaneous rate becoming unacceptable for connections of the CBR type.

Figure 3:
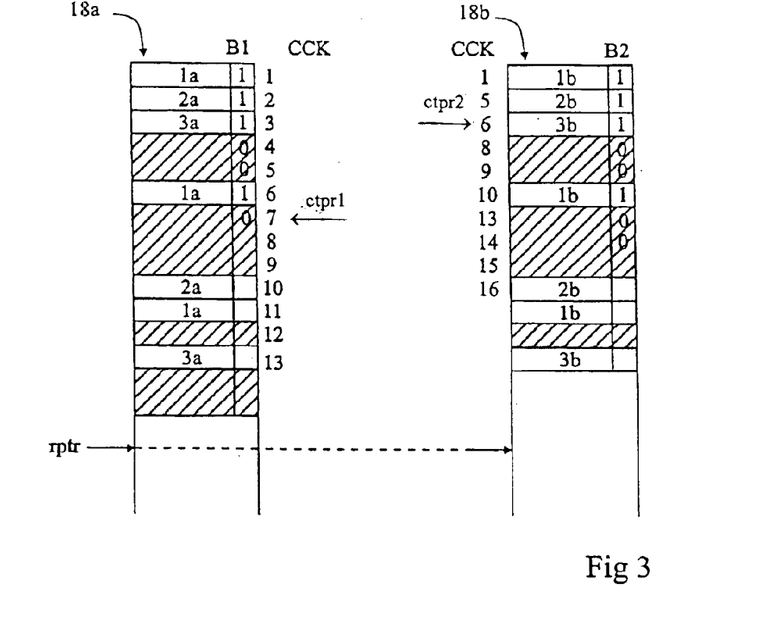
FIG. 3 illustrates a second memory organization that is used by a rate control method according to another embodiment of the present invention.

FIG. 3 illustrates a second memory organization according to another embodiment of the present invention that overcomes this problem. In the embodiment of FIG. 3, the queue 18 is separated in two half-queues 18$a$ and 18$b$ with independent cell pointers cptr1 and cptr2, respectively. Pointer cptr1 is incremented at the rate of cell clock CCK. When pointer cptr1 comes across an occupied location, the index is processed as described above with respect to FIG. 2. In parallel, pointer cptr2 moves across queue 18$b$.

If pointer cptr2 comes across an empty location of queue 18$b$, this pointer is incremented (like pointer cptr1) by clock CCK. However, if pointer cptr2 comes across an occupied location, no action is taken and pointer cptr2 is not incremented as long as pointer cptr1 of queue 18$a$ is at an occupied location. Only when pointer cptr1 comes across an empty location of queue 18$a$ is the location at which pointer cptr2 had stopped processed (that is, the corresponding cell is transmitted and pointer cptr2 is incremented).

Figure 4:
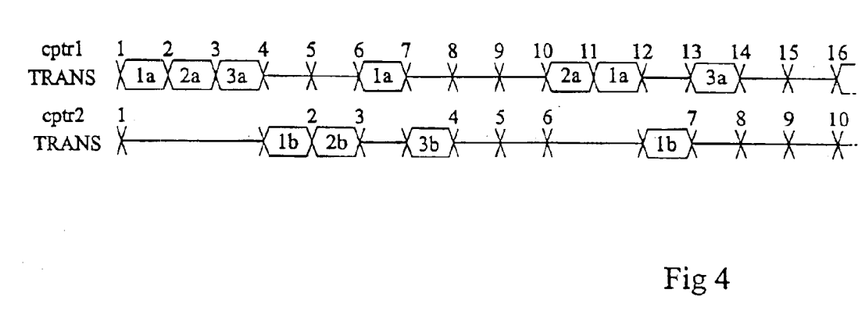
FIG. 4 shows a timing diagram illustrating an exemplary data transmission using the memory organization of FIG. 3.

FIG. 4 shows a timing diagram that illustrates an example of the processing of the indexes written into queues 18$a$ and 18$b$. In this example, it is assumed that three connections of the same rate as in FIG. 2 are written into queues 18a and 18b. The connections are designated as 1a, 2a, and 3a in queue 18a, and as 1b, 2b, and 3b in queue 18b. In FIG. 3, the consecutive cycles of cell clock CCK corresponding to the times when the pointers come across the locations are noted next to the queue locations.

At cycle 1, pointers cptr1 and cptr2 both indicate occupied locations, respectively containing an index 1a and an index 1b. Index 1a is immediately processed while the processing of index 1b is delayed and the incrementation of pointer cptr2 is prevented. At cycles 2 and 3, pointer cptr1 comes across indexes 2a and 3a, which are immediately processed while pointer cptr2 is still frozen. At cycles 4 and 5, pointer cptr1 comes across empty locations. This enables indexes 1b and 2b of queue 18b to be processed. At cycle 6, pointer cptr1 comes across a location occupied by index 1a, which index is immediately processed while pointer cptr2, which indicates the third location of queue 18b containing index 3b, is delayed.

At cycle 7, pointer cptr1 comes across an empty location again, which enables index 3b of FIG. 18b to be processed. At cycles 8 and 9, pointer cptr1 comes across two other empty locations, and pointer cptr2 also comes across two empty locations and is incremented. Thus, no processing is performed during these two cycles. At cycle 10, pointer cptr1 comes across a location occupied by index 2a and pointer cptr2 comes across a location containing index 1b. Index 2a is processed while the processing of index 1b is delayed. Index 1b is processed at cycle 12, when pointer cptr1 comes across an empty location again. Processing of queues 18a and 18b then continues in the same manner.

With the configuration of FIG. 3, the connections written into queue 18a appear to be processed in priority with respect to those inscribed in queue 18b. Thus, in preferred embodiments, the connections to which a high priority must be assigned (especially CBR and real time VBR connections) are written in queue 18a, and the other connections (VBR connections not in real time, ABR, and UBR) are written in queue 18b.

To avoid situations in which the connections of queue 18b would not be processed in time due to the fact that queue 18a includes a large number of consecutive indexes, the previously-described solution of writing ghost indexes can be used in queue 18a. As explained above, this avoids a concentration of consecutive indexes in queue 18a and thus favors the regular presence of empty locations to enable the regular processing of queue 18b. Further, when pointer cptr1 of queue 18a comes across a ghost index, since no cell is to be transmitted, an occupied location of queue 18b is processed during the cell time.

A second solution according to the present invention for avoiding processing delays in second queue 18b consists of incrementing pointer cptr1 of first queue 18a with a clock CCK having a slightly shorter period than a cell time, and providing a rate pointer rptr which is synchronous with the cell transmission and incremented by a number N of locations every N cell times. To compensate for the advance taken by pointer cptr1 with respect to the real transmission, the incrementation of pointer cptr1 is interrupted when it catches up to rate pointer rptr. During this interruption, occupied locations of queue 18b are processed. As soon as rate pointer rptr is incremented (by N), pointer cptr1 resumes its normal incrementation.

The period difference of clock CCK with respect to the cell time and increment N of rate pointer rptr are chosen so that cell pointer cptr1 has a few locations in advance at the time when it catches up to rate pointer rptr, with the effective number of advance locations being dynamically determinable according to the number of connections written into first queue 18a. At the time when pointer cptr1 catches up to rate pointer rptr, the processing of a few indexes will be over while the corresponding cells will not have been transmitted yet. The anticipated requests for reading FIFO memories 16 (FIG. 2) resulting therefrom will be stored in corresponding buffers of a few elements. Pointer cptr2 of second queue 18b is incremented by the same clock CCK as pointer cptr1, so pointer cptr2 is likely to take advance like pointer cptr1. The incrementation of pointer cptr2 will also be interrupted if it catches up to rate pointer rptr.

If the two above-mentioned solutions (alone or in combination) do not enable sufficiently fast processing of second queue 18b, a third solution according to the present invention can be used in combination with at least the second solution of using a rate pointer rptr. The third solution consists of counting the number of cells transmitted in first queue 18a and freezing pointer cptr1 when the counting reaches a limiting value. While pointer cptr1 is frozen, queue 18b is exclusively processed. The counter of transmitted cells is reset at the time when rate pointer rptr is incremented, which then allows the incrementing of counter cptr1 again. For example, one illustrative embodiment of the present invention uses an increment N of 8 for rate pointer rptr, a clock CCK such that pointer cptr1 takes an advance of 6 cells when it catches up on rate pointer rptr, and a maximum number of 5 transmitted cells in queue 18a before stopping the incrementation of pointer cptr1.

The organization of FIG. 3 enables the easy assignment of minimum pass-bands to the different connection types. For this purpose, the number of connections of each type is counted in the queues, and the creation of new connections of a given type is forbidden when the number of connection of this type reaches a maximum value, thus leaving a minimum pass-band for connections of another type. In further embodiments, a finer control method is used that counts the mean rates of the connections, instead of the connections of a given type. In this case, cell pointers cptr1 and cptr2 are incremented at different frequencies that respectively correspond to the pass-bands assigned to the types of connections associated with queues 18a and 18b. Two rate pointers rptr are then also provided, with each being associated with one of the queues 18a and 18b.

In further embodiments, the distribution of the connection types of FIG. 3 may be extended to more than two queues of decreasing priorities, with the processing of an index contained in a low priority queue being interrupted until the time when the pointers of all the higher priority queues simultaneously indicate an empty location. In one such exemplary embodiment, FIFOs of small size that respectively contain high priority data and, in the case of ATM networks, operation administration and maintenance data (OAM) that is transmitted in one burst at a time each time the corresponding FIFOs is selected, are respectively placed before first queue 18a and between the two queues 18a and 18b. The used index is excluded from the FIFO memory after each transmission.

While there has been illustrated and described what are presently considered to be the preferred embodiments of the present invention, it will be understood by those skilled in the art that various other modifications may be made, and equivalents may be substituted, without departing from the true scope of the present invention. Additionally, many modifications may be made to adapt a particular situation to the teachings of the present invention without departing from the central inventive concept described herein. Furthermore, an embodiment of the present invention may not include all of the features described above. Therefore, it is intended that the present invention not be limited to the particular embodiments disclosed, but that the invention include all embodiments falling within the scope of the appended claims.

What is claimed is:

1. A method for controlling the rates of concurrent digital transmissions using at least first and second queues having a plurality of locations, said method comprising the steps of:

for each transmission of high priority, writing an index corresponding to a data cell of the high-priority transmission at one of the locations in the first queue;

writing in the same way into the second queue indexes corresponding to transmissions of lower priority;

successively surveying the locations of the first queue at a rate corresponding to a cell transmission rate;

if the surveyed location in the first queue contains an index, transmitting the corresponding data cell, freeing the surveyed location, and rewriting the index at the location in the first queue that is distant from the surveyed location in the first queue by a value determined by the rate of the corresponding transmission;

successively surveying the locations of the second queue;

if the surveyed location in the second queue contains an index, transmitting the corresponding data cell when the surveyed location in the first queue does not contain an index, freeing the surveyed location in the second queue and rewriting the index at the location in the second queue that is distant from said surveyed location in the second queue by a value determined by the rate of the corresponding transmission;

interrupting the surveying of the first queue when the number of indexes in the first queue reaches a predetermined limit;

resuming the surveying of the first queue when a rate pointer is incremented;

writing a ghost index into at least one of the locations in the first queue; and if the surveyed location in the first queue contains a ghost index, freeing the surveyed location and rewriting the ghost index at one of the locations in the first queue.

2. A method for controlling the rates of concurrent digital transmissions using at least first and second queues having a plurality of locations, said method comprising the steps of:

for each transmission of high priority, writing an index corresponding to a data cell of the high-priority transmission at one of the locations in the first queue;

writing in the same way into the second queue indexes corresponding to transmissions of lower priority;

successively surveying the locations of the first queue at a rate corresponding to a cell transmission rate;

if the surveyed location in the first queue contains an index, transmitting the corresponding data cell, freeing the surveyed location, and rewriting the index at the location in the first queue that is distant from the surveyed location in the first queue by a value determined by the rate of the corresponding transmission;

successively surveying the locations of the second queue;

if the surveyed location in the second queue contains an index, transmitting the corresponding data cell when the surveyed location in the first queue does not contain an index, freeing the surveyed location in the second queue and rewriting the index at the location in the second queue that is distant from said surveyed location in the second queue by a value determined by the rate of the corresponding transmission;

writing a ghost index into at least one of the locations in the first queue; and if the surveyed location in the first queue contains a ghost index, freeing the surveyed location and rewriting the ghost index at one of the locations in the first queue.

3. The method of claim 2, wherein the ghost index is rewritten at a random distance from the surveyed location.

4. A method for controlling the rates of concurrent digital transmissions using at least first and second queues having a plurality of locations, said method comprising the steps of:

for each transmission, writing an index corresponding to a data cell of the transmission at one of the locations in the first queue and/or the second queue;

successively surveying the locations of the first queue at a higher rate than a cell transmission rate;

successively surveying the locations of the second queue;

if the surveyed location in the first queue contains an index, transmitting the corresponding data cell, freeing the surveyed location, and rewriting the index at the location in the first queue that is distant from the surveyed location by a predetermined value;

interrupting the surveying of the first queue when the location indicated by a rate pointer is reached;

incrementing the rate pointer by N locations at the transmission rate of N cells; and if the surveyed location in the second queue contains an index, transmitting the corresponding data cell when the surveyed location in the first queue does not contain an index or when the surveying of the first queue is interrupted.

5. A machine-readable medium encoded with a program for controlling the rates of concurrent digital transmissions using at least first and second queues having a plurality of locations, said program containing instructions for performing the steps of:

for each transmission of high priority, writing an index corresponding to a data cell of the high-priority transmission at one of the locations in the first queue;

writing in the same way into the second queue indexes corresponding to transmissions of lower priority;

successively surveying the locations of the first queue at a rate corresponding to a cell transmission rate;

if the surveyed location in the first queue contains an index, transmitting the corresponding data cell, freeing the surveyed location, and rewriting the index at the location in the first queue that is distant from the surveyed location in the first queue by a value determined by the rate of the corresponding transmission;

successively surveying the locations of the second queue;

if the surveyed location in the second queue contains an index, transmitting the corresponding data cell when the surveyed location in the first queue does not contain an index, freeing the surveyed location in the second queue and rewriting the index at the location in the second queue that is distant from said surveyed location in the second queue by a value determined by the rate of the corresponding transmission;

interrupting the surveying of the first queue when the number of indexes in the first queue reaches a predetermined limit;

resuming the surveying of the first queue when a rate pointer is incremented;

writing a ghost index into at least one of the locations in the first queue; and if the surveyed location in the first queue contains a ghost index, freeing the surveyed location and rewriting the ghost index at one of the locations in the first queue.

6. A machine-readable medium encoded with a program for controlling the rates of concurrent digital transmissions using at least first and second queues having a plurality of locations, said program containing instructions for performing the steps of:

for each transmission of high priority, writing an index corresponding to a data cell of the high-priority transmission at one of the locations in the first queue;

writing in the same way into the second queue indexes corresponding to transmissions of lower priority;

successively surveying the locations of the first queue at a rate corresponding to a cell transmission rate;

if the surveyed location in the first queue contains an index, transmitting the corresponding data cell, freeing the surveyed location, and rewriting the index at the location in the first queue that is distant from the surveyed location in the first queue by a value determined by the rate of the corresponding transmission;

successively surveying the locations of the second queue;

if the surveyed location in the second queue contains an index, transmitting the corresponding data cell when the surveyed location in the first queue does not contain an index, freeing the surveyed location in the second queue and rewriting the index at the location in the second queue that is distant from said surveyed location in the second queue by a value determined by the rate of the corresponding transmission;

writing a ghost index into at least one of the locations in the first queue; and if the surveyed location in the first queue contains a ghost index, freeing the surveyed location and rewriting the ghost index at one of the locations in the first queue.

7. A machine-readable medium encoded with a program for controlling the rates of concurrent digital transmissions using at least first and second queues having a plurality of locations, said program containing instructions for performing the steps of:

for each transmission, writing an index corresponding to a data cell of the transmission at one of the locations in the first queue and/or the second queue;

successively surveying the locations of the first queue at a higher rate than a cell transmission rate;

successively surveying the locations of the second queue;

if the surveyed location in the first queue contains an index, transmitting the corresponding data cell, freeing the surveyed location, and rewriting the index at the location in the first queue that is distant from the surveyed location by a predetermined value;

interrupting the surveying of the first queue when the location indicated by a rate pointer is reached;

incrementing the rate pointer by N locations at the transmission rate of N cells; and if the surveyed location in the second queue contains an index, transmitting the corresponding data cell when the surveyed location in the first queue does not contain an index or when the surveying of the first queue is interrupted.

8. A method for controlling rates of concurrent digital transmissions, comprising:

using at least first and second queues, each having a plurality of locations;

for each transmission of relatively high priority, writing an index corresponding to a data cell of the relatively high priority transmission in one of the locations in the first queue;

for each transmission of relatively low priority, writing an index corresponding to a data cell of the relatively low priority transmission in one of the locations in the second queue;

successively accessing the locations in the first queue at a rate corresponding to a cell transmission rate;

if the accessed location in the first queue contains an index, transmitting the corresponding data cell, freeing the accessed location, and rewriting the index at a location in the first queue that is distant from the accessed location in the first queue by a value determined by the rate of the corresponding transmission;

successively accessing the locations in the second queue; and if the accessed location in the second queue contains an index, transmitting the corresponding data cell when the accessed location in the first queue does not contain an index, freeing the accessed location in the second queue and rewriting the index at a location in the second queue that is distant from the accessed location in the second queue by a value determined by the rate of the corresponding transmission;

wherein the index is rewritten in the first queue at a distance from the accessed location that is inversely proportional to the rate of the corresponding transmission.

9. A method for controlling rates of concurrent digital transmissions, comprising:

using at least first and second queues, each having a plurality of locations;

for each transmission of relatively high priority, writing an index corresponding to a data cell of the relatively high priority transmission in one of the locations in the first queue;

for each transmission of relatively low priority, writing an index corresponding to a data cell of the relatively low priority transmission in one of the locations in the second queue;

successively accessing the locations in the first queue at a rate corresponding to a cell transmission rate;

if the accessed location in the first queue contains an index, transmitting the corresponding data cell, freeing the accessed location, and rewriting the index at a location in the first queue that is distant from the accessed location in the first queue by a value determined by the rate of the corresponding transmission;

successively accessing the locations in the second queue;

if the accessed location in the second queue contains an index, transmitting the corresponding data cell when the accessed location in the first queue does not contain an index, freeing the accessed location in the second queue and rewriting the index at a location in the second queue that is distant from the accessed location in the second queue by a value determined by the rate of the corresponding transmission;

associating a first cell pointer with the first queue and a second cell pointer with the second queue;

incrementing each cell pointer when the respective accessed location is not occupied;

incrementing one of the cell pointers when the corresponding data cell is transmitted; and not incrementing the second cell pointer when the accessed locations in the first and second queues are both occupied.

10. A method as defined in claim 9, wherein the first and second cell pointers are incremented at different rates that correspond to the passbands assigned to the types of connections associated with the first and second queues.

11. A method for controlling rates of concurrent digital transmissions, comprising:

using at least first and second queues, each having a plurality of locations;

for each transmission of relatively high priority, writing an index corresponding to a data cell of the relatively high priority transmission in one of the locations in the first queue;

for each transmission of relatively low priority, writing an index corresponding to a data cell of the relatively low priority transmission in one of the locations in the second queue;

successively accessing the locations in the first queue at a rate corresponding to a cell transmission rate;

if the accessed location in the first queue contains an index, transmitting the corresponding data cell, freeing the accessed location, and rewriting the index at a location in the first queue that is distant from the accessed location in the first queue by a value determined by the rate of the corresponding transmission;

successively accessing the locations in the second queue;

if the accessed location in the second queue contains an index, transmitting the corresponding data cell when the accessed location in the first queue does not contain an index, freeing the accessed location in the second queue and rewriting the index at a location in the second queue that is distant from the accessed location in the second queue by a value determined by the rate of the corresponding transmission;

writing a ghost index into at least one of the locations in the first queue; and if the accessed location in the first queue contains a ghost index, freeing the accessed location and rewriting the ghost index in the first queue at a random distance from the accessed location.

12. A method for controlling rates of concurrent digital transmissions, comprising:

using at least first and second queues, each having a plurality of locations;

for each transmission, writing an index corresponding to a data cell of the transmission in one of the locations in the first queue or the second queue;

successively accessing the locations of the first queue at a higher rate than a cell transmission rate;

successively accessing the locations of the second queue;

if the accessed location in the first queue contains an index, transmitting the corresponding data cell, freeing the accessed location, and rewriting the index at a location in the first queue that is distant from the accessed location by a predetermined value;

interrupting the accessing of the first queue when a location indicated by a rate pointer is reached;

incrementing the rate pointer by N locations at the transmission rate of N cells; and if the accessed location in the second queue contains an index, transmitting the corresponding data cell when the accessed location in the first queue does not contain an index or when the accessing of the first queue is interrupted.

13. A method for controlling rates of concurrent digital transmissions, comprising:

using a queue having a plurality of locations;

for each transmission, writing an index corresponding to a data cell of the transmission at one of the locations in the queue;

successively accessing the locations of the queue at a rate corresponding to a cell transmission rate;

if the accessed location in the queue contains an index, transmitting the corresponding data cell, freeing the accessed location, and rewriting the index at a location in the queue that is distant from the accessed location by a value determined by the rate of the corresponding transmission;

writing a ghost index into at least one of the locations in the queue; and if the accessed location in the queue contains a ghost index, freeing the accessed location and rewriting the ghost index in the queue at a random distance from the accessed location.

14. Apparatus for controlling rates of concurrent digital transmissions, comprising:

a memory having defined therein at least first and second queues, each having a plurality of locations; and a controller including:

means, for each transmission of relatively high priority, for writing an index corresponding to a data cell of the relatively high priority transmission in one of the locations in the first queue;

means, for each transmission of relatively low priority, for writing an index corresponding to a data cell of the relatively low priority transmission in one of the locations in the second queue;

means for successively accessing the locations in the first queue at a rate corresponding to a cell transmission rate;

means, if the accessed location in the first queue contains an index, for transmitting the corresponding data cell, for freeing the accessed location and for rewriting the index at a location in the first queue that is distant from the accessed location in the first queue by a value determined by the rate of the corresponding transmission;

means for successively accessing the locations in the second queue; and means, if the accessed location in the second queue contains an index, for transmitting the corresponding data cell when the accessed location in the first queue does not contain an index, for freeing the accessed location in the second queue and for rewriting the index at a location in the second queue that is distant from the accessed location in the second queue by a value determined by the rate of the corresponding transmission, wherein the index is rewritten in the first queue at a distance from the accessed location that is inversely proportional to the rate of the corresponding transmission.

15. Apparatus for controlling rates of concurrent digital transmissions, comprising:

a memory having defined therein at least first and second queues, each having a plurality of locations; and a controller including:
   means, for each transmission of relatively high priority, for writing an index corresponding to a data cell of the relatively high priority transmission in one of the locations in the first queue;
   means, for each transmission of relatively low priority, for writing an index corresponding to a data cell of the relatively low priority transmission in one of the locations in the second queue;
   means for successively accessing the locations in the first queue at a rate corresponding to a cell transmission rate;
   means, if the accessed location in the first queue contains an index, for transmitting the corresponding data cell, for freeing the accessed location and for rewriting the index at a location in the first queue that is distant from the accessed location in the first queue by a value determined by the rate of the corresponding transmission;
   means for successively accessing the locations in the second queue;
   means, if the accessed location in the second queue contains an index, for transmitting the corresponding data cell when the accessed location in the first queue does not contain an index, for freeing the accessed location in the second queue and for rewriting the index at a location in the second queue that is distant from the accessed location in the second queue by a value determined by the rate of the corresponding transmission;
   means for associating a first cell pointer with the first queue and a second cell pointer with the second queue;
   means for incrementing each cell pointer when the respective accessed location is not occupied;
   means for incrementing one of the cell pointers when the corresponding data cell is transmitted; and
   means for not incrementing the second cell pointer when the accessed locations in the first and second queues are both occupied.

16. Apparatus as defined in claim 15, wherein the first and second cell pointers are incremented at different rates that correspond to the passbands assigned to the types of connections associated with the first and second queues.

17. Apparatus for controlling rates of concurrent digital transmissions, comprising:
   a memory having defined therein at least first and second queues, each having a plurality of locations; and
   a controller including:
      means, for each transmission of relatively high priority, for writing an index corresponding to a data cell of the relatively high priority transmission in one of the locations in the first queue;
      means, for each transmission of relatively low priority, for writing an index corresponding to a data cell of the relatively low priority transmission in one of the locations in the second queue;
      means for successively accessing the locations in the first queue at a rate corresponding to a cell transmission rate;
      means, if the accessed location in the first queue contains an index, for transmitting the corresponding data cell, for freeing the accessed location and for rewriting the index at a location in the first queue that is distant from the accessed location in the first queue by a value determined by the rate of the corresponding transmission;
      means for successively accessing the locations in the second queue;
      means, if the accessed location in the second queue contains an index, for transmitting the corresponding data cell when the accessed location in the first queue does not contain an index, for freeing the accessed location in the second queue and for rewriting the index at a location in the second queue that is distant from the accessed location in the second queue by a value determined by the rate of the corresponding transmission;
      means for writing a ghost index into at least one of the locations in the first queue; and
      means, if the accessed location in the first queue contains a ghost index, for freeing the accessed location and for rewriting the ghost index in the first queue at a random distance from the accessed location.

18. Apparatus for controlling rates of concurrent digital transmissions, comprising:
   a memory having defined therein at least first and second queues, each having a plurality of locations; and
   a controller including:
      means, for each transmission, for writing an index corresponding to a data cell of the transmission in one of the locations in the first queue or the second queue;
      means for successively accessing the locations of the first queue at a higher rate than a cell transmission rate;
      means for successively accessing the locations of the second queue;
      means, if the accessed location in the first queue contains an index, for transmitting the corresponding data cell, for freeing the accessed location, and for rewriting the index at a location in the first queue that is distant from the accessed location by a predetermined value;
      means for interrupting the accessing of the first queue when a location indicated by a rate pointer is reached;
      means for incrementing the rate pointer by N locations at the transmission rate of N cells; and
      means, if the accessed location in the second queue contains an index, for transmitting the corresponding data cell when the accessed location in the first queue does not contain an index or when the accessing of the first queue is interrupted.

19. Apparatus for controlling rates of concurrent digital transmissions, comprising:
   a memory having defined therein at least first and second queues, each having a plurality of locations; and
   a controller including:
      means, for each transmission, for writing an index corresponding to a data cell of the transmission in one of the locations in the first queue or the second queue;
      means for successively accessing the locations of the first queue at a higher rate than a cell transmission rate;
      means for successively accessing the locations of the second queue;
      means, if the accessed location in the first queue contains an index, for transmitting the corresponding data cell, for freeing the accessed location, and for rewriting the index at a location in the first queue that is distant from the accessed location by a predetermined value;

means for interrupting the accessing of the first queue when a location indicated by a rate pointer is reached;

means for incrementing the rate pointer by N locations at the transmission rate of N cells;

means for interrupting the accessing of the first queue when the number of indexes in the first queue reaches a predetermined limit; and means for resuming the accessing of the first queue when the rate pointer is incremented.

20. Apparatus for controlling rates of concurrent digital transmissions, comprising:

a memory having defined therein a queue having a plurality of locations; and a controller including:

means, for each transmission, for writing an index corresponding to a data cell of the transmission at one of the locations in the queue;

means for successively accessing the locations of the queue at a rate corresponding to a cell transmission rate;

means, if the accessed location in the queue contains an index, for transmitting the corresponding data cell, for freeing the accessed location, and for rewriting the index at a location in the queue that is distant from the accessed location by a value determined by the rate of the corresponding transmission;

means for writing a ghost index into at least one of the locations in the queue; and means, if the accessed location in the queue contains a ghost index, for freeing the accessed location and for rewriting the ghost index in the queue at a random distance from the accessed location.

* * * * *